6758X
W. Bryent.
Reservoir Cooking Stove.
Patented Sept. 13, 1831.
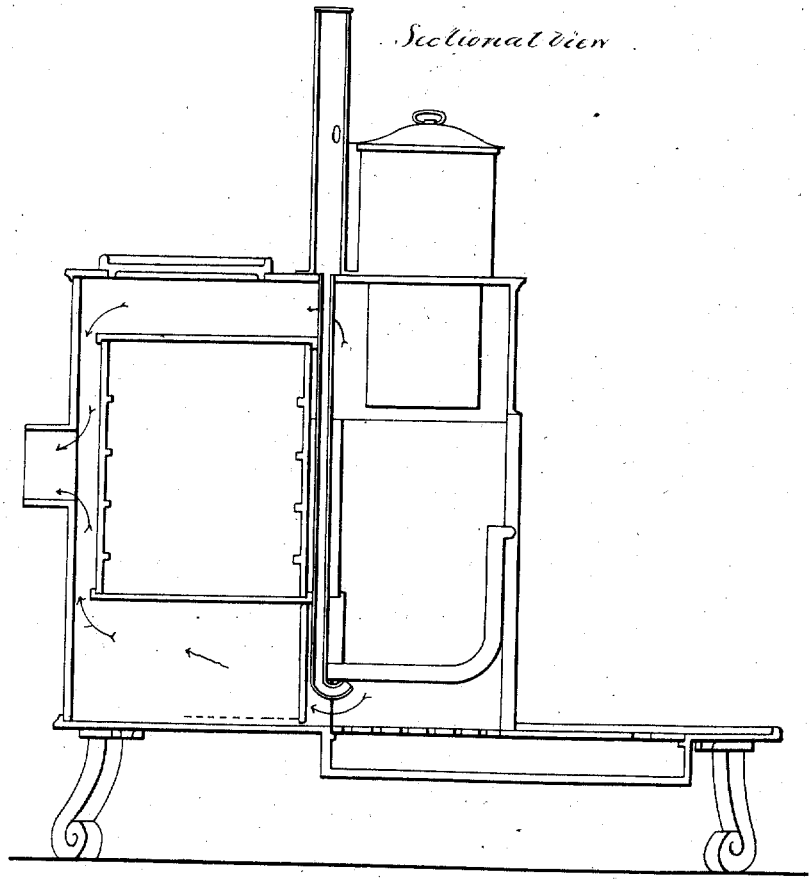

Walter Bryent
Letters Patent

The Schedule referred to in these Letters Patent and making part of
the same containing a description in the words of the said Walter Bryent
himself of his improvement denominated the Anthracite Cooking Stove

---

1. The external shell or frame of the stove is of cast iron of convenient di-
mensions for different families or establishments. 2. A common grate
suitable for anthracite coal is fixed in front the bars bending under
& extending back to about the middle of the stove with a space under
neath to receive the embers which are deposited & removed when ne-
cessary in the usual manner 3. In the rear of this grate is placed another
grate consisting of perpendicular bars & forming the rear wall of the furnace & a
damper of cast iron is placed immediately behind this perpendicular
grate governed by an exterior crank or handle. This damper is kept
closed when the oven is not used & excludes the heat of the furnace from pass-
ing off to the rear, 4 The oven is placed in the rear of the stove, its bottom on a
level with the top of the perpendicular grate. The heat from the furnace
is communicated to its bottom by removing the damper before described
& also passes freely from the furnace over the top but it may be increased
or diminished as required by means of another damper placed on a level
with the top of the oven & made to slide horizontally by means of exterior
handles so as to close the whole or any part of the passage in the rear of the oven
at pleasure. 5. The smaller boilers are placed forward immediately over
the furnace & a larger one for washing &c in the rear over the oven. Near
the centre of the stove is fixed a perpendicular tube or pipe the head of which
rises considerably above the top of the stove & the bottom of which opens by an
aperture immediately under the main grate or furnace. The covers of the
boilers are furnished with short pipes which receive the steam & convey
it to the perpendicular tube into which they are inserted by suitable aper-
tures when used which apertures may at other times be closed by slides.
The steam so offensive in common stoves thus passes off and is conducted un-
der

6758X der the furnace where the effluvia are decomposed or neutralized by the heat. 6. The main grate or furnace may be enclosed at the sides & also in the rear above the perpendicular or rear grate by a partition or lining of soap stone or of any material suitable to resist the heat in such a situation. The heat may be increased by the application of a blower & the front of the furnace being entirely open the conveniences for roasting are furnished when requisite. By inserting a water vessel in a parlor stove the advantages of conveying off the steam & of absorbing or neutralizing the effluvia may be attained in the same manner as in the cooking stove Walter Bryant Witnesses
Margaret Ross
George W. Adams 566 [illegible]